(12) United States Patent
Ding et al.

(10) Patent No.: US 11,306,245 B2
(45) Date of Patent: Apr. 19, 2022

(54) METHOD FOR PREPARING CSPBX3 PEROVSKITE QUANTUM DOT FILM BY ONE-STEP CRYSTALLIZATION (71) Applicant: NORTH CHINA ELECTRIC POWER UNIVERSITY, Beijing (CN)

(72) Inventors: Yong Ding, Beijing (CN); Cheng Liu, Beijing (CN); Songyuan Dai, Beijing (CN); Yi Yang, Beijing (CN); Xuepeng Liu, Beijing (CN); Molang Cai, Beijing (CN)

(73) Assignee: NORTH CHINA ELECTRIC POWER UNIVERSITY, Beijing (CN)

(*) Notice: Subject to any disclaimer, the term of this patent is extended or adjusted under 35 U.S.C. 154(b) by 319 days.

(21) Appl. No.: 16/747,733

(22) Filed: Jan. 21, 2020

(65) Prior Publication Data
US 2021/0108137 A1 Apr. 15, 2021

(30) Foreign Application Priority Data

Oct. 9, 2019 (CN) .......................... 201910953500.X (51) Int. Cl.
*C09K 11/66* (2006.01)
*C23C 18/02* (2006.01)
(Continued)

(52) U.S. Cl.
CPC ............ *C09K 11/665* (2013.01); *B05D 1/005* (2013.01); *C01G 21/16* (2013.01); *C23C 18/02* (2013.01);
(Continued)

(58) Field of Classification Search
CPC .............................. C09K 11/665; C23C 18/02
See application file for complete search history.

(56) References Cited

U.S. PATENT DOCUMENTS

2020/0287137 A1* 9/2020 Bailie ................ H01L 51/0026

FOREIGN PATENT DOCUMENTS

CN 104409639 A 3/2015
CN 107195710 A * 9/2017
(Continued)

OTHER PUBLICATIONS

CN107195710A, machine translation. (Year: 2017).*
(Continued)

*Primary Examiner* — Robert A Vetere
(74) *Attorney, Agent, or Firm* — Bacon & Thomas, PLLC (57) ABSTRACT

The present disclosure provides a method for preparing a perovskite quantum dot film by one-step crystallization, and belongs to the field of perovskite quantum dot material technology. The present disclosure uses adamantanemethylamine and hydrohalic acid as ligands, first mixes a cesium halide, a lead halide, and the ligands with a solvent to obtain a precursor solution, then deposits the precursor solution on a substrate, and then heats the substrate to obtain the $CsPbX_3$ perovskite quantum dot film. The present disclosure uses adamantanemethylamine and hydrohalic acid as the ligands, which can quickly coat the perovskite, complex with the $CsPbX_3$ perovskite, and directly form the perovskite quantum dot via a strong steric effect. Further, the present disclosure is simple and inexpensive, can directly obtain a high-quality perovskite quantum dot film with a thickness of more than 500 nm by one-step crystallization.

7 Claims, 9 Drawing Sheets (51) Int. Cl.
    *C23C 18/12* (2006.01)
    *B82Y 40/00* (2011.01)
    *B05D 1/00* (2006.01)
    *C01G 21/16* (2006.01)
    *B82Y 20/00* (2011.01)

(52) U.S. Cl.
    CPC ......... *C23C 18/1204* (2013.01); *B82Y 20/00* (2013.01); *B82Y 40/00* (2013.01); *C01P 2002/82* (2013.01); *C01P 2002/84* (2013.01); *C01P 2004/03* (2013.01); *C01P 2004/04* (2013.01); *C01P 2004/64* (2013.01)

(56) References Cited

FOREIGN PATENT DOCUMENTS

| CN | 107195710 A | 9/2017 |
| CN | 108258157 A | 7/2018 |
| CN | 109004048 A | 12/2018 |
| CN | 109504379 A | 3/2019 |

OTHER PUBLICATIONS

Zhang et al., "Synthesis and optical properties of novel organic-inorganic hybrid nanolayer structure semiconductors," Acta Materialia 57, 2009, pp. 3301-3309. (Year: 2009).*

M.M. Tavakoli et al, "Addition of Adamantylammonium Iodide to Hole Transport Layers enables Highly Efficient and Electroluminisecent Perovskite Solar Cells", Energy & Environmental Science, The Royal Society of Chemistry 2018, pp. 3310-3320.

First Office Action cited in corresponding International Appln. No. 201910953500 dated Apr. 23, 2020.

* cited by examiner

METHOD FOR PREPARING CSPBX3 PEROVSKITE QUANTUM DOT FILM BY ONE-STEP CRYSTALLIZATION

TECHNICAL FIELD

The present disclosure relates to the field of perovskite quantum dot material technology, and specifically to a method for preparing a $CsPbX_3$ perovskite quantum dot film by one-step crystallization.

BACKGROUND

In recent years, with its characteristics, such as high photoluminescence efficiency, adjustable band gap, and narrow emission wavelength, quantum dots have been widely used in solar cells, lasers, light emitting diodes, biological imaging, and the like. Recently, perovskite quantum dots have attracted great attention, and have good charge migration ability, photoelectric conversion characteristics, and defect tolerance, thus showing great potentials in optical fields, electrical fields, and other fields. The $CsPbX_3$ (X=Cl, Br, or I) perovskite quantum dot has many unique properties, such as its adjustable energy level by controlling halide components, controlling the quantum restriction effect by controlling the size of the perovskite quantum dot; and very easily adjusting the bandgap of the perovskite quantum dot by adjusting the ratio of a halogen atom (Cl, Br, or I) in the material, such that the photoluminescence emission spectrum fully covers the entire visible wavelength range of 400-800 nm. Thus, the perovskite quantum dot is considered as an ideal material for the next generation solar cells and the light emitting diodes.

Preparation of the perovskite quantum dot film mainly includes quantum dot synthesis and quantum dot film preparation. At present, the conventional method for synthesizing a perovskite quantum dot mainly includes a heat injection process and a ligand-assisted reprecipitation process. The heat injection process is a process of rapidly injecting a precursor into a high-temperature solvent containing a ligand and remaining precursors, and finally synthesizing the quantum dot. However, the operations of this process are complex, various parameters of the synthesis process have sensitive effects on the quantum dot size, size distribution, and appearance, and it is difficult to control the synthesis process, which is expensive, thus greatly limiting the application thereof. The ligand-assisted reprecipitation process needs to first make the quantum dot into a colloidal quantum dot dispersion, and then performs film deposition, the preparation process of which is also complex.

Further, the colloidal quantum dot dispersion synthesized using the conventional method is at a low concentration, and therefore when preparing a quantum dot film with a thickness of a few hundred nanometers, it is often necessary to wash the ligand in the film with a large amount of non-polar solvent, and then repeat multi-step deposition. This complex process has also become another obstacle on the way of industrial production of the perovskite quantum dot. Therefore, finding a simple, effective, easily operating and inexpensive production process for a quantum dot film has become a most important problem of commercialization of the perovskite quantum dot in the future.

SUMMARY

In view of this, an object of the present disclosure is to provide a method for preparing a $CsPbX_3$ perovskite quantum dot film by one-step crystallization. This simple and inexpensive method can directly obtain a high-quality perovakite quantum dot film with a thickness of more than 500 nm by one-step crystallization.

In order to achieve the above object of the present disclosure, the present disclosure provides the following technical solutions.

The present disclosure provides a method for preparing a $CsPbX_3$ perovskite quantum dot film by one-step crystallization, including the following steps:

(1) mixing a cesium halide, a lead halide, and a ligand with a solvent to obtain a precursor solution;

(2) depositing the precursor solution on a substrate, and then heating the substrate to obtain the $CsPbX_3$ perovskite quantum dot film;

X in the $CsPbX_3$ being one or more of Cl, Br, or I; and the ligand being adamantanemethylamine and hydrohalic acid.

Preferably, a molar ratio of adamantanmethylamine to hydrohalic acid in the ligand is 1:2 to 2:1.

Preferably, the solvent in step (1) is one or more of N, N-dimethyl formamide, dimethyl sulfoxide, γ-butyrolactone, or N, N-dimethyl acetamide.

Preferably, a molar ratio of the cesium halide to the lead halide to the ligand to the solvent in step (1) is (0.1-2) mol:(0.1-2) mol:(0.1-2) mol:1 mL.

Preferably, the depositing approach in step (2) is spin coating, drop coating, scrape coating, spray coating, or printing.

Preferably, when the depositing approach is the spin coating, the spin coating includes a first stage and a second stage in sequence, the spin coating in the first stage is at a rate of 1000 rpm for a duration of 10 s, and at an acceleration of 500 rpm·s$^{-1}$ from rest to reaching the spin coating rate; and the spin coating in the second stage is at a rate of 2000 rpm for a duration of 20 s, and at an acceleration of 1000 rpm·s$^{-1}$ from the spin coating rate in the first stage to reaching the spin coating rate in the second stage.

Preferably, the heating in step (2) is at a temperature of 60-180° C. for a duration of 1-30 min.

The present disclosure provides a method for preparing a $CsPbX_3$ perovskite quantum dot film by one-step crystallization. The present disclosure first mixes a cesium halide, a lead halide, and a ligand with a solvent to obtain a precursor solution, then deposits the precursor solution on a substrate, and then heats the substrate to obtain the $CsPbX_3$ perovskite quantum dot film. The present disclosure uses adamantanemethylamine and hydrohalic acid as a strong ligand system due to the synergistic effect thereof which can quickly coat the perovskite, complex with the $CsPbX_3$ perovskite, and directly form the perovskite quantum dot via a strong steric effect. Further, the present disclosure directly omits synthesizing a colloidal quantum dot dispersion of the conventional method, as well as solvent cleaning and multi-step film formation in the film formation process, and can directly obtain a high-quality perovskite quantum dot film with a thickness of more than 500 nm by one-step crystallization of the precursor solution. The operation method is simple and inexpensive with strong controllability. The resulting perovskite quantum dot film is characterized by high repetitive rate, high stability, good fluorescence properties, and uniform crystal grain distribution. Further, the present disclosure can control the particle size of the quantum dot by controlling concentrations of the ligand and the halides in the precursor solution, the heating temperature and duration, thus changing the emission wavelength thereof. Results of the examples show that the $CsPbX_3$ perovskite quantum dot film obtained from the method of the present disclosure still remains 90% original luminous intensity in its photoluminescence spectrum after humidity (40%) aging in 30 days.

DESCRIPTION OF THE EMBODIMENTS

The present disclosure provides a method for preparing a $CsPbX_3$ perovskite quantum dot film by one-step crystallization, including the following steps:

(1) mixing a cesium halide, a lead halide, and a ligand with a solvent to obtain a precursor solution;

(2) depositing the precursor solution on a substrate, and then heating the substrate to obtain the $CsPbX_3$ perovskite quantum dot film;

X in the $CsPbX_3$ being one or more of Cl, Br, or I; and the ligand being adamantanemethylamine and hydrohalic acid.

The present disclosure mixes the cesium halide, the lead halide, and the ligand with the solvent to obtain the precursor solution. In the present disclosure, the ligand is adamantanamethylamine and hydrohalic acid; and a molar ratio of adamantanemethylamine to hydrohalic acid is preferably 1:2-2:1, and more preferably 1:1. The present disclosure uses adamantanemethylamine and hydrohalic acid as a strong ligand system due to the synergistic effect thereof, which can quickly coat the perovskite, complex with the $CsPbX_3$ perovskite, and directly form the perovskite quantum dot via a strong steric effect.

In the present disclosure, the cesium halide is preferably one or more of CsCl, CsBr, or CsI; the lead halide is preferably one or more of $PbCl_2$, $PbBr_2$, or $PbI_2$; and the solvent is preferably one or more of N, N-dimethyl formamide, dimethyl sulfoxide, γ-butyrolactone, or N, N-dimethyl acetamide. In the present disclosure, a molar ratio of the cesium halide to the lead halide to the ligand to the solvent is preferably (0.1-2) mol:(0.1-2) mol:(0.1-2) mol:1 mL, and more preferably 0.6 mol:0.6 mol:1.3 mol:1 mL. The present disclosure can effectively control the thickness of the obtained film by changing concentrations of the cesium halide, the lead halide, and the ligand in the precursor solution. The present disclosure does not provide special requirements for the mixing approach, and a mixing approach familiar to those skilled in the art may be used to uniformity mix the cesium halide, the lead halide, and the ligand with the solvent.

After obtaining the precursor solution, the present disclosure deposits the precursor solution on the substrate, and then heating the substrate to obtain the $CsPbX_3$ perovskite quantum dot film. In the present disclosure, the depositing approach is preferably spin coating, drop coating, scrape coating, spray coating, or printing, and more preferably spin coating. In the present disclosure, when the depositing approach is the spin coating, the spin coating preferably includes a first stage and a second stage in sequence, the spin coating in the first stage is preferably at a rate of 1000 rpm preferably for a duration of 10 s, and preferably at an acceleration of 500 rpm·s$^{-1}$ from rest to reaching the spin coating rate; and the spin coating in the second stage is preferably at a rate of 2000 rpm preferably for a duration of 20 s, and preferably at an acceleration of 1000 rpm·s$^{-1}$ from the spin coating rate in the first stage to reaching the spin coating rate in the second stage. The present disclosure begins to compute the spin coating duration after reaching the spin coating rate in the first stage and the spin coating rate in the second stage. The present disclosure does not provide special requirements for the substrate. A substrate material familiar to those skilled in the art may be used.

In the present disclosure, the heating temperature is preferably 60-180° C., and more preferably 80-140° C.; and the heating duration is preferably 1-30 min, and more preferably 10-20 min. The present disclosure preferably heats the substrate on which the precursor solution is deposited on a heating stage. The present disclosure can remove the solvent in the precursor solution by heating; and make the cesium halide and the lead halide form a $CsPbX_3$ perovskite quantum dot crystal by one-step deposition and heating, where the ligand can quickly coat the perovskite, complex with the $CsPbX_3$ perovskite, and directly form the perovskite quantum dot via the strong steric effect.

After completing the heating, the present disclosure preferably cools the film obtained after the heating to room temperature. The present disclosure does not provide special requirements for the cooling approach. A cooling approach familiar to those skilled in the art may be used, specifically for instance statically cooling.

Compared with the conventional heat injection process or ligand-assisted reprecipitation process, the present disclosure directly omits synthesizing a colloidal quantum dot dispersion, whilst omitting solvent cleaning and multi-step film deposition in the conventional film formation process by spin coating of the colloidal quantum dot dispersion. The one-step crystallization of the present disclosure directly obtains a perovskite quantum dot film only by one-step deposition, heating, and crystallization of the precursor solution, and is simple with strong controllability. The product has high repetitive rate, and very low cost, and the resulting $CsPbX_3$ perovskite quantum dot film has a thickness of more than 500 nm. Further, the present disclosure can control the particle size of the quantum dot by controlling the concentration, the heating temperature and duration of the precursor, thus changing the emission wavelength thereof.

The method for preparing a $CsPbX_3$ perovskite quantum dot film by one-step crystallization provided in the present disclosure will be described in detail below in combination with the examples, but the examples cannot be construed as limiting the scope of protection of the present disclosure.

Example 1

(1) 0.6 mol of cesium iodide and lead iodide were fully dissolved in 1 mL of DMF, respectively, then 0.65 mol of adamantanemethylamine and 0.65 mol of hydroiodic acid were added respectively as a ligand, and then the solution was fully stirred for use as a precursor solution.

(2) The precursor solution was dropped on a substrate, spin coated with a spin coater at 1000 rpm for 10 s, and then spin coated at 2000 rpm for 20 s (at an acceleration of 500 and 1000 rpm·s$^{-1}$ respectively). The spin coated precursor solution was divided into 7 groups. Each group was heated at a heating temperature of 60° C., 80° C., 100° C., 120° C., 140° C., 160° C., and 180° C. respectively for a heating duration of 3 min, and then cooled, to obtain a $CsPbI_3$ perovskite quantum dot film respectively.

Figure 1:
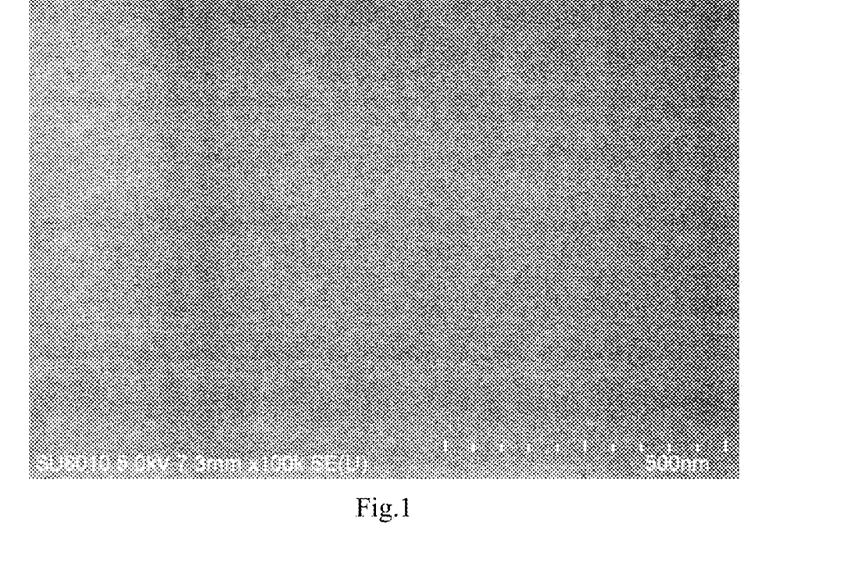
FIG. 1 is a scanning electron micrograph of surface of a $CsPbI_3$ perovskite quantum dot film obtained in Example 1.

Scanning electron microscopic analysis results of surface of the $CsPbI_3$ perovsakite quantum dot film at the heating temperature of 100° C. are shown in FIG. 1. As can be seen from FIG. 1, the $CsPbI_3$ perovskite quantum dot film obtained in the present disclosure has compact surface and uniform crystal size. Scanning electron microscopic analysis results of the surface of the $CsPbI_3$ perovskite quantum dot film at other heating temperatures are similar to FIG. 1.

Figure 2:
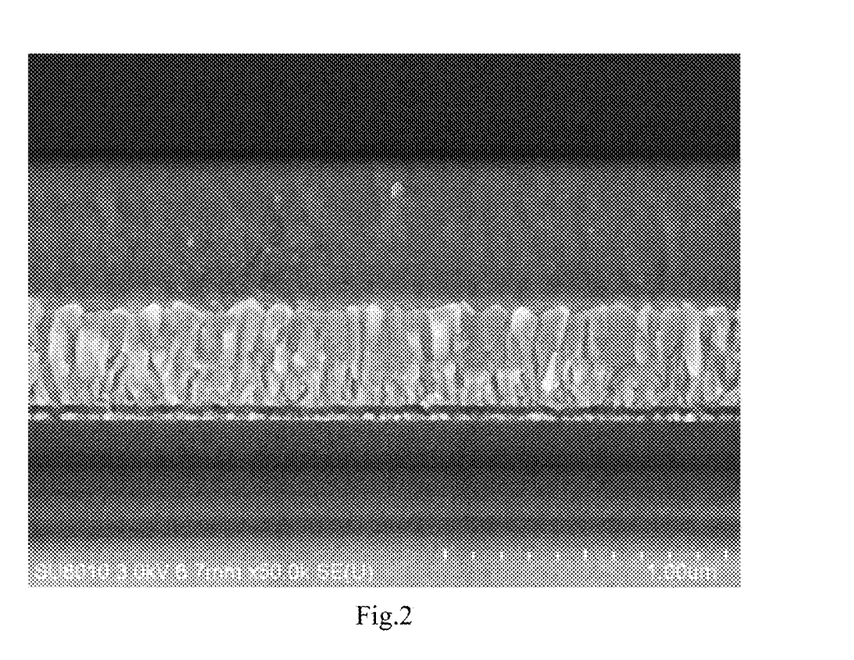
FIG. 2 is a scanning electron micrograph of a section of the $CsPbI_3$ perovskite quantum dot film obtained in Example 1.

Scanning electron microscopic analysis results of a section of the $CsPbI_3$ perovskite quantum dot film at the heating temperature of 100° C. are shown in FIG. 2. As can be seen from FIG. 2, a thickness of the $CsPbI_3$ perovskite quantum dot film obtained in the present disclosure can directly reach 530 nm, such that the conventional redundant process of first synthesis and then multi-step deposition is successfully replaced with the one-step method. Scanning electron microscopic analysis results of the section of the $CsPbI_3$ perovskite quantum dot film at other heating temperatures are similar to FIG. 1.

Figure 3:
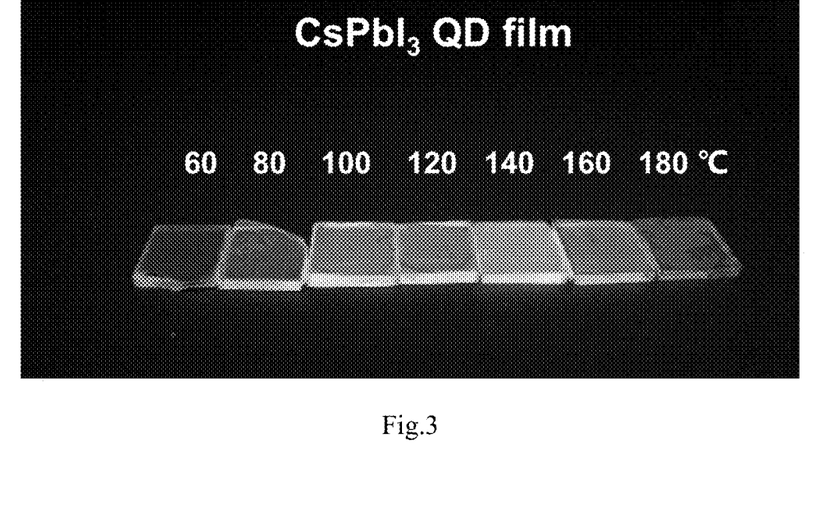
FIG. 3 is a photo of fluorescence emitted from the $CsPbI_3$ perovskite quantum dot film obtained at different heating temperatures in Example 1 under UV irradiation.

Fluorescent photos of the $CsPbI_3$ perovakite quantum dot films prepared at different heating temperatures under UV irradiation are shown in FIG. 3. As can be seen from FIG. 3, the $CsPbI_3$ perovskite quantum dot film has smooth surface, and emits obvious fluorescence under UV irradiation. With the increase of the heating temperature, light emitted from the fin gradually turns from light yellow to dark red.

Figure 4:
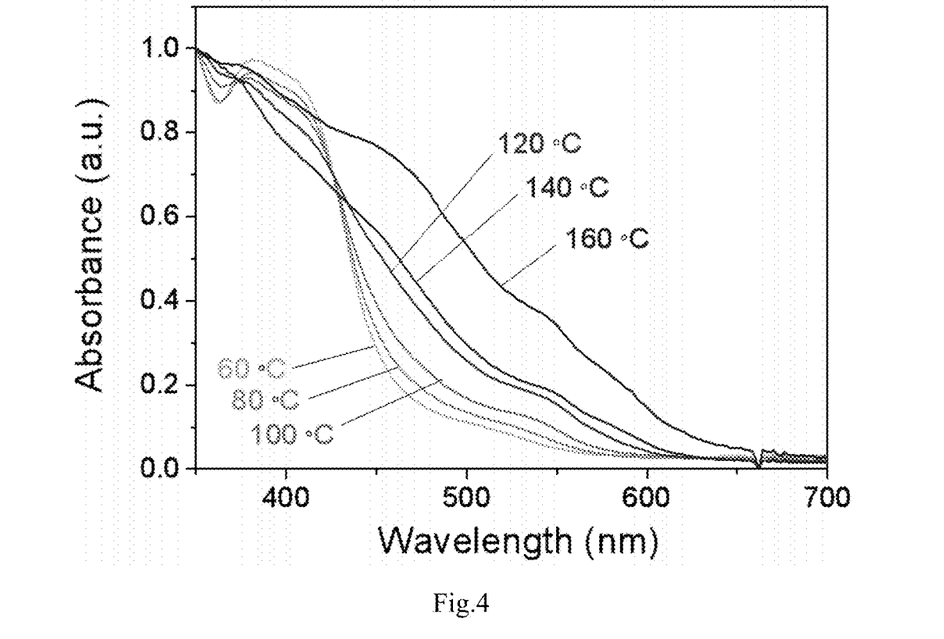
FIG. 4 is a UV-visible-near IR absorption spectrum of the $CsPbI_3$ perovskite quantum dot film obtained at different heating temperatures in Example 1.

UV-visible-near IR absorption spectra of the $CsPbI_3$ perovskite quantum dot film prepared at different heating temperatures are shown in FIG. 4. As can be seen from FIG. 4, with the increase of the heating temperature from 60° C. to 160° C., an absorption edge wavelength of the $CsPbI_3$ perovskite quantum dot film obtained in the present disclosure is gradually increased from 560 nm to 650 nm.

Figure 5:
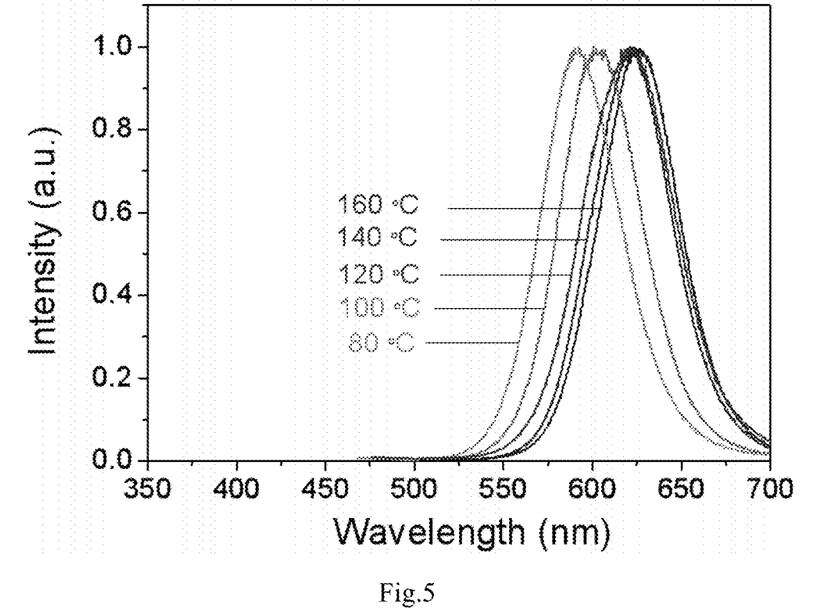
FIG. 5 is a photoluminescence spectrum of the $CsPbI_3$ perovskite quantum dot film obtained in Example 1.

Photoluminescence spectra of the $CsPbI_3$ perovskite quantum dot film prepared at different heating temperatures are shown in FIG. 5. As can be seen from FIG. 5, a fluorescence wavelength of photoluminescence of the $CsPbI_3$ perovskite quantum dot film obtained in the present disclosure may vary with the heating temperature, suggesting that the present disclosure can control the particle size of the quantum dot by changing the heating temperature.

Figure 6:
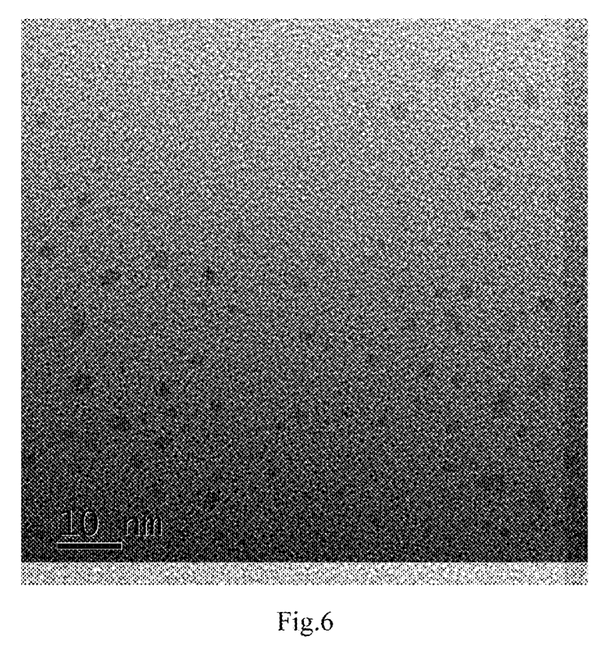
FIG. 6 is a transmission electron micrograph of the $CsPbI_3$ perovskite quantum dot film obtained in Example 1 after peeling and dispersion.

Transmission electron microscopic analysis results of the $CsPbI_3$ perovskite quantum dot film at the heating temperature of 100° C. after peeling and dispersion are shown in FIG. 6. As can be seen from FIG. 6, a particle diameter of the resulting $CsPbI_3$ perovskite quantum dot is about 2 nm.

Figure 7:
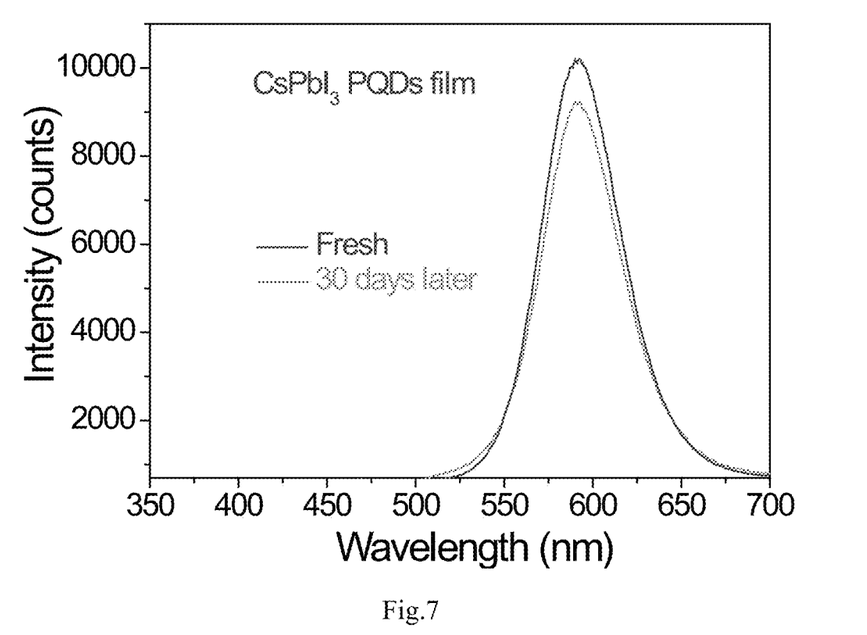
FIG. 7 is a photoluminescence spectrum of the $CsPbI_3$ perovskite quantum dot film obtained in Example 1 before and after humidity (humidity≈40%) aging in 30 days.

Humidity aging of the $CsPbI_3$ perovskite quantum dot film at the heating temperature of 100° C. was tested under a test condition of humidity (humidity≈40%) aging in 30 days, and the results are shown in FIG. 7. As can be seen from FIG. 7, after humidity (humidity-40%) aging in 30 days, a photoluminescence spectrum of the $CsPbI_3$ perovskite quantum dot film obtained in the present disclosure still remains 90% original luminous intensity.

Example 2

(1) 0.5 mol of cesium iodide and lead iodide were fully dissolved in 1 mL of DMSO respectively, then 0.65 mol of adamantanmethylamine and 0.65 mol of hydrobromic acid were added respectively as a ligand, and then the solution was fully stirred for use as a precursor solution.

(2) The precursor solution was dropped on a substrate, spin coated with a spin coater at 1000 rpm for 10 s, and then spin coated at 2000 rpm for 20 s (at an acceleration of 500 and 1000 rpm·s$^{-1}$ respectively). The spin coated precursor solution was divided into 6 groups. Each group was heated at a heating temperature of 60° C., 80° C., 100° C., 120° C., 140° C., and 160° C. respectively for a heating duration of 3 min, and then cooled, to obtain a $CsPbBr_3$ perovskite quantum dot film.

Figure 8:
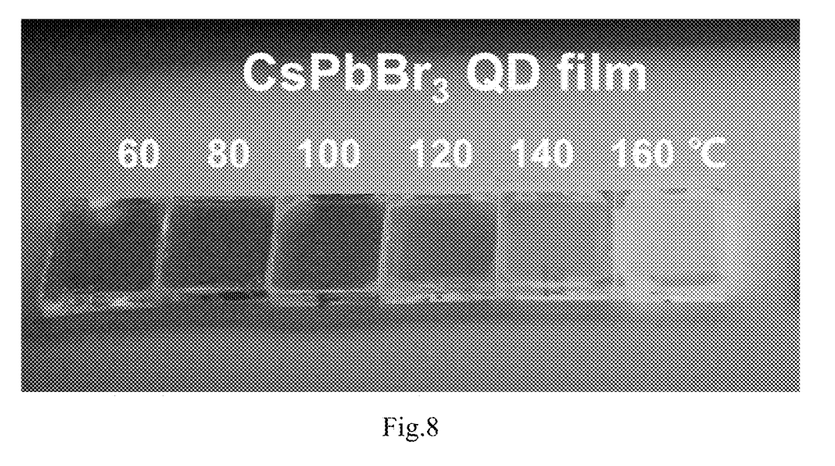
FIG. 8 is a photo of fluorescence emitted from a $CsPbBr_3$ perovskite quantum dot film obtained at different heating temperatures in Example 2 under UV irradiation.

Fluorescent photos of the $CsPbBr_3$ perovskite quantum dot film prepared at different heating temperatures are shown in FIG. 8. As can be seen from FIG. 8, the $CsPbBr_3$ perovskite quantum dot film obtained in the present disclosure has smooth surface, and emits obvious green fluorescence under UV irradiation. With the increase of the heating temperature, light emitted from the film gradually turns from blue green to bright green.

Figure 9:
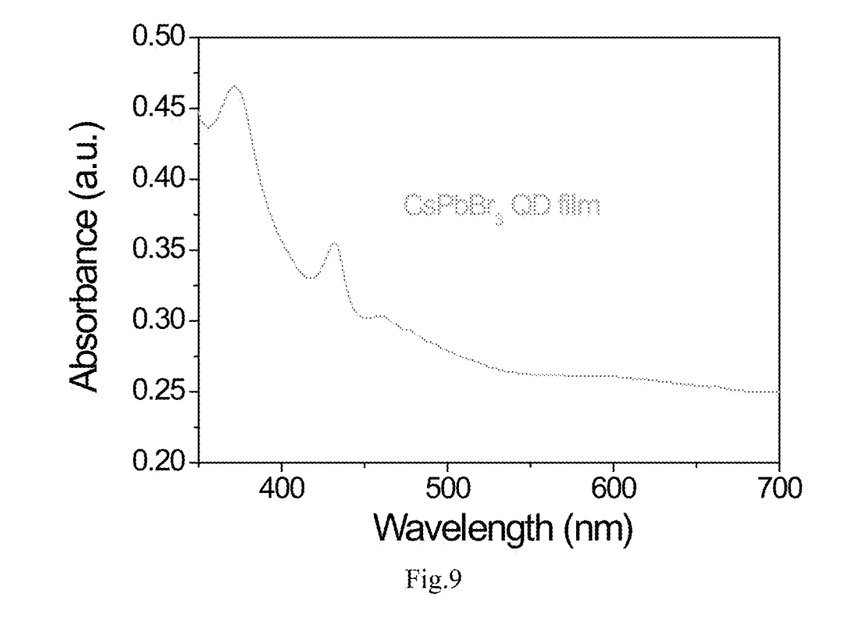
FIG. 9 is a UV-visible-near IR absorption spectrum of the $CsPbBr_3$ perovskite quantum dot film obtained in Example 2.

A UV-visible-near IR absorption spectrum of the $CsPbBr_3$ perovskite quantum dot film at the heating temperature of 120° C. is shown in FIG. 9. As can be seen from FIG. 9, an absorption edge wavelength of the $CsPbBr_3$ perovskite quantum dot film prepared at 120° C. in the present disclosure is about 530 nm.

Figure 10:
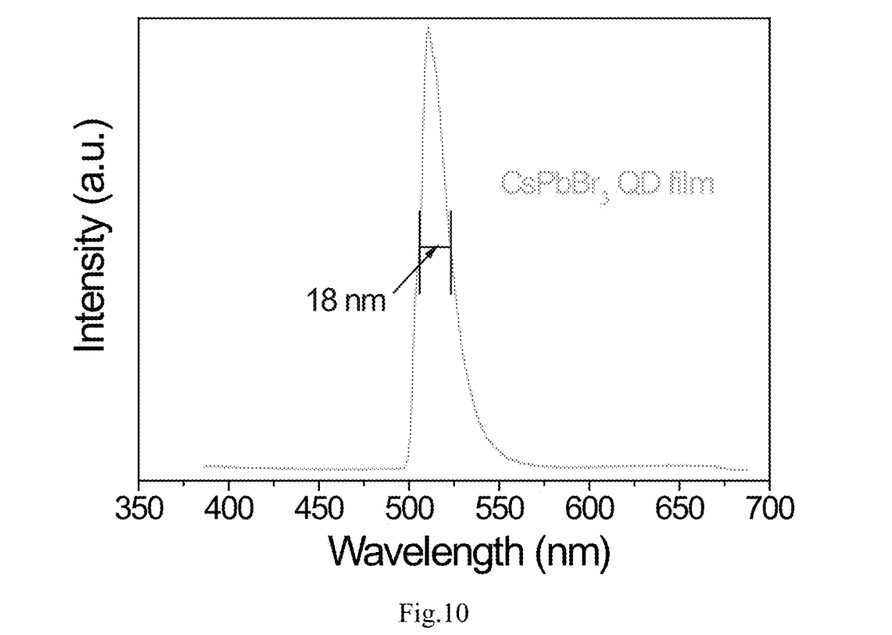
FIG. 10 is a photoluminescence spectrum of the $CsPbBr_3$ perovskite quantum dot film obtained in Example 2.

A photoluminescence spectrum of the $CsPbBr_3$ perovskite quantum dot film at the heating temperature of 120° C. is shown in FIG. 10. As can be seen from FIG. 10, a fluorescence wavelength of photoluminescence of the $CsPbBr_3$ perovskite quantum dot film prepared at 120° C. in the present disclosure is about 510 nm. Moreover, a peak width at half height of a fluorescence excitation peak is 18 nm, which is less than 20 nm, indicating that the quantum dot film prepared in the present disclosure has good fluorescence properties and very uniform crystal grain distribution.

Figure 11:
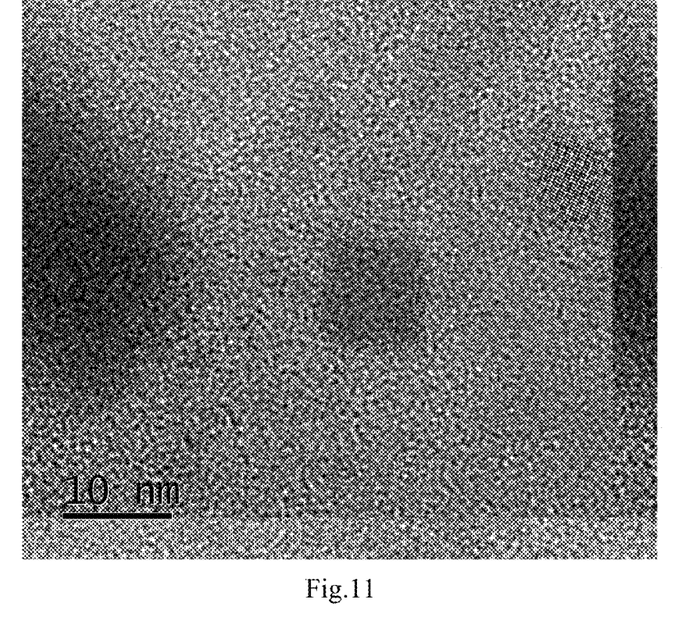
FIG. 11 is a transmission electron micrograph of the $CsPbBr_3$ perovskite quantum dot film obtained in Example 2 after peeling and dispersion.

Transmission electron microscopic analysis results of the $CsPbBr_3$ perovakite quantum dot film at 120° C. after peeling and dispersion are shown in FIG. 11. As can be seen from FIG. 11, a particle diameter of the resulting $CsPbBr_3$ perovakite quantum dot is about 8 nm.

Example 3

(1) 0.2 mol of cesium chloride and lead chloride were fully dissolved in 1 mL of DMF respectively, then 0.65 M of adamantanemethylamine and 0.65 M of hydrochloric acid were added respectively as a ligand, and then the solution was fully stirred for use as a precursor solution.

(2) The precursor solution was dropped on a substrate, spin coated with a spin coater at 1000 rpm for 10 s, and then spin coated at 2000 rpm for 20 s (at an acceleration of 500 and 1000 rpm·s$^{-1}$ respectively). The precursor solution was crystallized at a heating and temperature of 140° C. for a heating duration of 3 min, and then cooled, to obtain a $CsPbCl_3$ perovskite quantum dot film.

Figure 12:
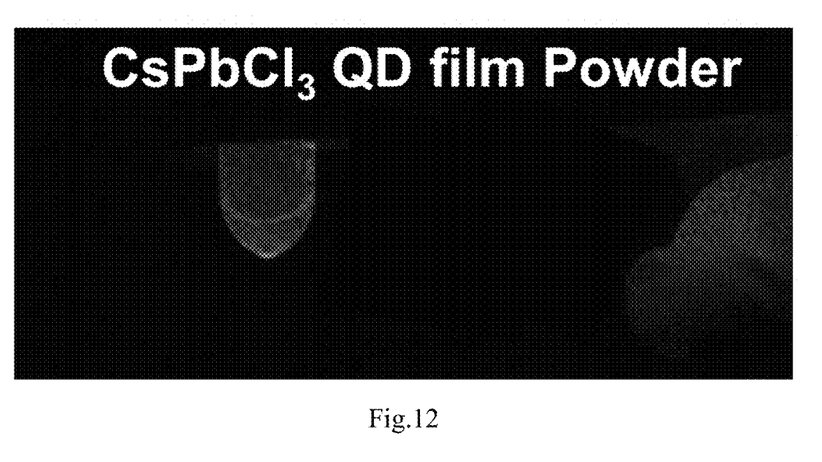
FIG. 12 is a photo of fluorescence emitted from a $CsPbCl_3$ perovskite quantum dot film powder obtained in Example 3 under UV irradiation.

The resulting $CsPbCl_3$ perovakite quantum dot film was scraped into powder, and formulated into a chlorobenzene dispersion at a mass concentration of 5 mg/mL. A photo of fluorescence emitted from the resulting dispersion under UV irradiation is shown in FIG. 12. As can be seen from FIG. 12, the chlorobenzene dispersion of the $CsPbCl_3$ perovskite quantum dot film obtained in the present disclosure can emit obvious blue fluorescence under UV irradiation.

Figure 13:
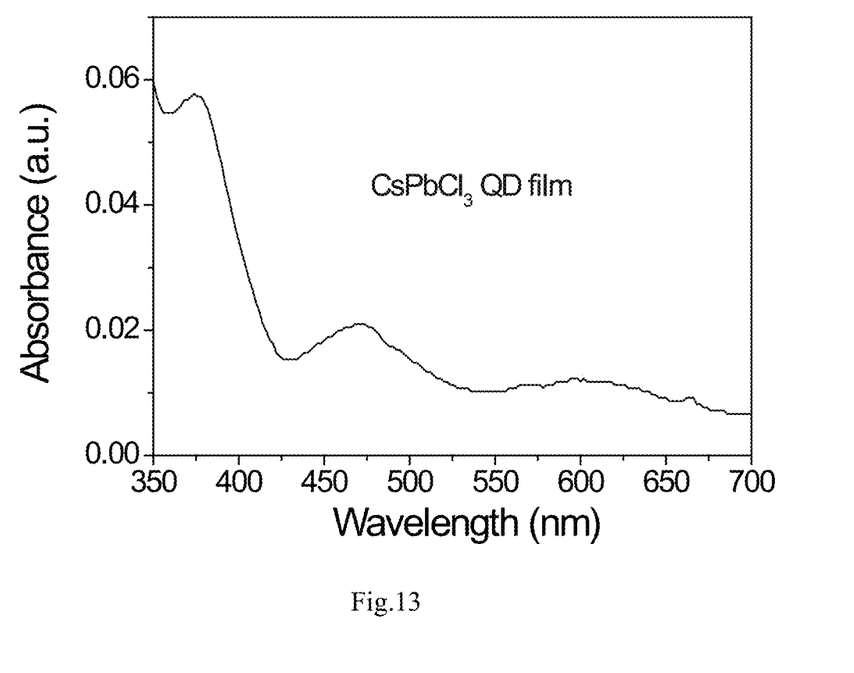
FIG. 13 is a UV-visible-near IR absorption spectrum of the $CsPbCl_3$ perovkite quantum dot film obtained in Example 3.

A UV-visible-near IR absorption spectrum of the resulting $CsPbCl_3$ perovskite quantum dot film is shown in FIG. 13. As can be seen from FIG. 13, an absorption edge wavelength of the $CsPbCl_3$ perovskite quantum dot film obtained in the present disclosure is about 425 nm.

Figure 14:
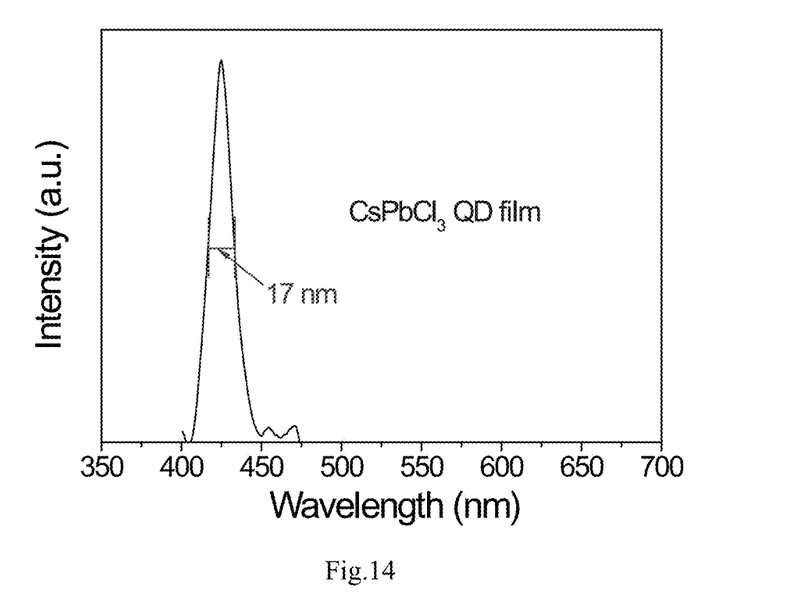
FIG. 14 is a photoluminescence spectrum of the $CsPbCl_3$ perovkite quantum dot film obtained in Example 3.

A photoluminescence spectrum of the resulting $CsPbCl_3$ perovskite quantum dot film is shown in FIG. 14. As can be seen from FIG. 14, a fluorescence wavelength of photoluminescence of the $CsPbCl_3$ perovskite quantum dot film obtained in the present disclosure is about 425 nm, and a peak width at half height of a fluorescence excitation peak is 17 nm, which is less than 20 nm, indicating that the quantum dot film prepared in the present disclosure has good fluorescence properties and very uniform crystal grain distribution.

Figure 15:
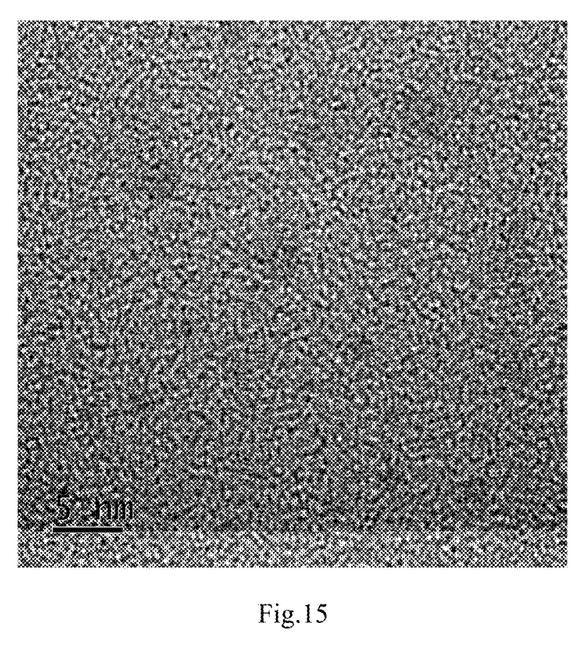
FIG. 15 is a transmission electron micrograph of the $CsPbCl_3$ perovskite quantum dot film obtained in Example 3 after peeling and dispersion.

Transmission electron microscopic analysis results of the $CsPbCl_3$ perovskite quantum dot film after peeling and dispersion are shown in FIG. 15. As can be seen from FIG. 15, a particle diameter of the $CsPbCl_3$ perovskite quantum dot obtained in the present disclosure is about 3 nm.

Comparison Example 1

The ligands in Example 1 were replaced with oleylamine, octylamine, or 4-phenyl butylamine respectively, while other components remained unchanged, to obtain a precursor solution. The precursor solution was spin coated on a substrate by a similar approach, heated at 100° C. for 3 min, and then cooled to obtain perovskite quantum dot films of different ligands respectively.

Figure 16:
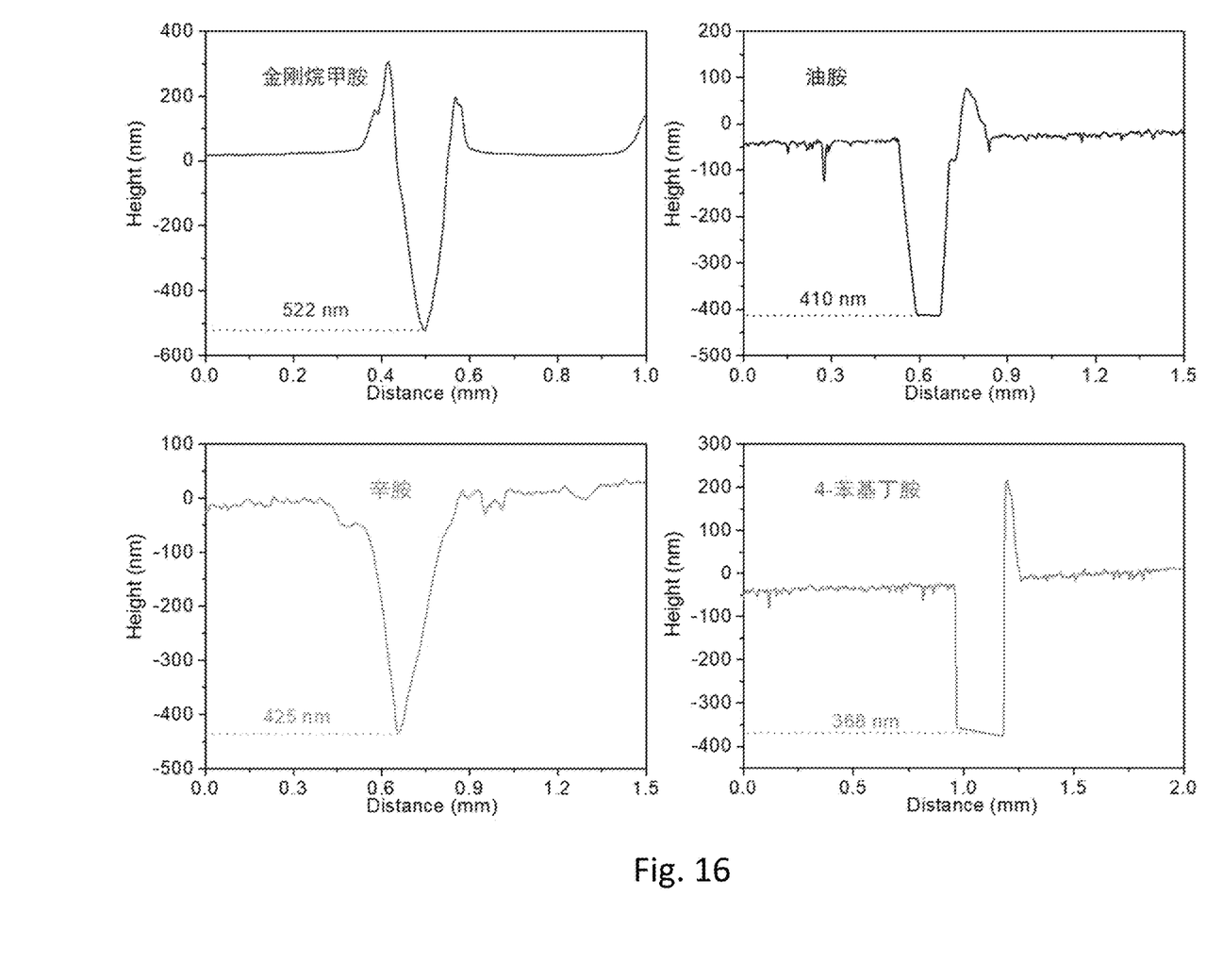
FIG. 16 is a thickness analysis chart of a perovskite quantum dot film obtained in Example 1 and a perovskite quantum dot film obtained in Comparison Example 1 with a step profiler.

Thickness analysis results of a section of the above perovskite quantum dot film and a section of the perovskite quantum dot film in Example 1 with a step profiler are shown in FIG. 16. Thickness of the perovskite film obtained from a conventional long chain ligand, such as oleylamine or octylamine, is about 400 nm, the resulting quantum dot film is obviously oily on its surface, and the quantum dot film has poor quality. A thickness of the perovskite film obtained with 4-phenyl butylamine as the ligand is 360 nm. Thus it can be seen that, quality and a thickness of the perovskite quantum dot film obtained by one-step crystallization with a conventional ligand, such as oleylamine, octylamine, or 4-phenyl butylamine, fail to reach levels of the quantum dot film prepared with adamantanemethylamine and hydrohalic acid.

As can be seen from the above examples, the method for preparing a $CsPbX_3$ perovskite quantum dot film by one-step crystallization provided in the present disclosure involves simple operations, and can obtain a high-quality perovskite quantum dot film with a thickness of more than 500 nm by one-step deposition and direct crystallization. The resulting perovskite quantum dot film is characterized by good fluorescence properties, uniform crystal grain distribution, and good stability.

The above description only provides preferred embodiments of the present disclosure. It should be noted that those of ordinary skills in the art may further make a number of improvements and modifications without departing from the principle of the present disclosure, and such improvements and modifications should also be regarded as falling within the scope of protection of the present disclosure.

What is claimed is:

1. A method for preparing a $CsPbX_3$ perovskite quantum dot film by one-step crystallization, comprising:
   (1) mixing a cesium halide, a lead halide, and a ligand with a solvent to obtain a precursor solution;
   (2) depositing the precursor solution on a substrate, and then heating the substrate to obtain the $CsPbX_3$ perovskite quantum dot film;
   X in the $CsPbX_3$ being one or more of Cl, Br, or I; and
   the ligand being adamantanemethylamine and hydrohalic acid.

2. The method according to claim 1, wherein a molar ratio of adamantanemethylamine to hydrohalic acid in the ligand is 1:2-2:1.

3. The method according to claim 1, wherein the solvent in step (1) is one or more of N, N-dimethyl formamide, dimethyl sulfoxide, γ-butyrolactone, or N, N-dimethyl acetamide.

4. The method according to claim 1, wherein a molar ratio of the cesium halide to the lead halide to the ligand to the solvent in step (1) is (0.1-2) mol:(0.1-2) mol:(0.1-2) mol:1 mL.

5. The method according to claim 1, wherein the depositing approach in step (2) is spin coating, drop coating, scrape coating, spray coating, or printing.

6. The method according to claim 5, wherein when the depositing approach is the spin coating, the spin coating comprises a first stage and a second stage in sequence, the spin coating in the first stage is at a rate of 1000 rpm for a duration of 10 s, and at an acceleration of 500 rpm·s$^{-1}$ from rest to reaching the spin coating rate; and the spin coating in the second stage is at a rate of 2000 rpm for a duration of 20 s, and at an acceleration of 1000 rpm·s$^{-1}$ from the spin coating rate in the first stage to reaching the spin coating rate in the second stage.

7. The method according to claim 1, wherein the heating in step (2) is at a temperature of 60° C.-180° C. for a duration of 1-30 min.

\* \* \* \* \*